April 28, 1959 G. E. BARNHART 2,883,744
METHOD OF COLD WORKING A TUBULAR STRUCTURE
Filed Oct. 18, 1954 2 Sheets-Sheet 1
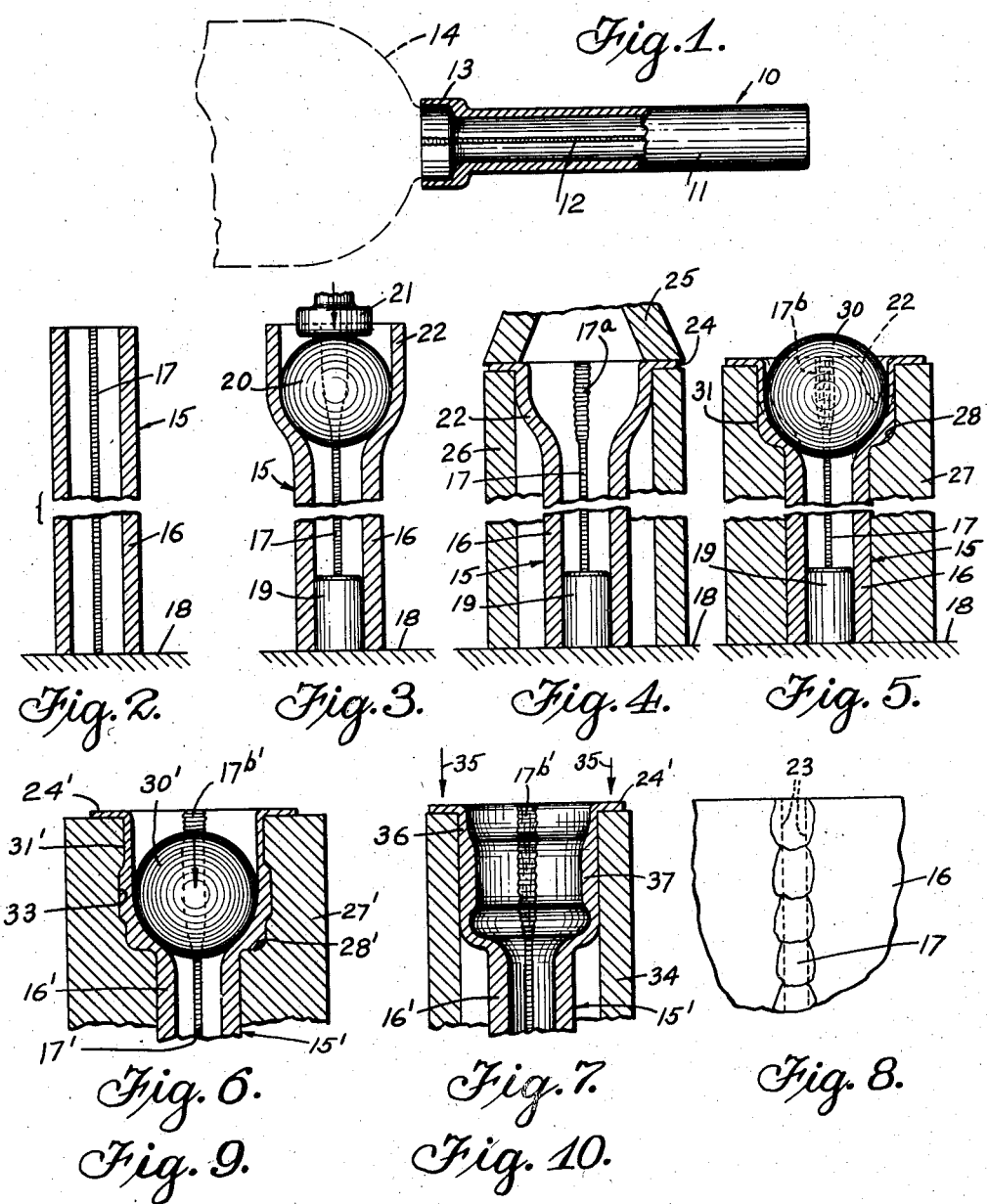
INVENTOR.
George E. Barnhart.
BY
AGENT.

April 28, 1959 G. E. BARNHART 2,883,744
METHOD OF COLD WORKING A TUBULAR STRUCTURE
Filed Oct. 18, 1954 2 Sheets-Sheet 2

INVENTOR.
George E. Barnhart.
BY
AGENT.

United States Patent Office 2,883,744
Patented Apr. 28, 1959

2,883,744

METHOD OF COLD WORKING A TUBULAR STRUCTURE

George E. Barnhart, Altadena, Calif.

Application October 18, 1954, Serial No. 463,021

1 Claim. (Cl. 29—544)

The present invention relates generally to a method of forming welded tubular structures and to the article thus formed by the method, and relates more specifically to a welded tubular structure forming method wherein means are provided to cold work a welded seam in order to orient the grain structure thereof and provide for metal strength in the area of the welded seam that is commensurate with the strength of other portions of the tubular structure.

This application is a continuation-in-part of my application Serial Number 416,215 filed March 15, 1954 for Welded Tubular Structures and Method of Forming Same, now abandoned.

Heretofore, it has often been desirable to utilize welded tubes and welded tubular material in fabrication of various articles; however, the strength of such welded material, especially in areas in and adjacent to the weld therein, prohibited such use particularly in situations where internal or external stresses were applied to the finished product. Additionally, with most types of welded tubular material, slight imperfections in surface delineation and pores in the material prohibited the use of such material in situations where concise sealing was required or where secondary members were adapted for sliding movement along a surface of the material and line of the welded seam. In another instance, means were not always readily available, nor of such economy, as to enable efficient testing of welded tubular material, in order that the strength of a welded seam and the areas adjacent the seam might be determined.

It is generally known by those skilled in the art to which this invention appertains, that welded tubular material is approximately one-half the price of seamless tubing, and an increased general usage of welded structures for the manufacture of precision articles therefore reduces the overall cost of such articles and enables increased marketability of the product. Inasmuch as work must be accomplished on welded tubular material in order to place this material in a condition for use in the manufacture of precision products, it is therefore important that the method utilized to accomplish such working be rapid, economical and efficient in order not to increase labor time and raise the price of the finished article to that which might be expected should seamless tubular material be used.

It is also well known that the prior art teaches the use of various processes and methods by which seamless tubing may be formed or worked in order to create various articles. However, this invention is directed primarily to the forming of welded tubing and to the simultaneous conditioning of the material in and adjacent to a welded seam in order that such material will have a strength equal to or greater than that obtained in other portions of the material. In other words, the present invention provides means by which the material's grains structure in and adjacent to a welded seam may be worked or otherwise conditioned to raise the strength thereof to a point where the elastic yield is within approximately ninty percent of the ultimate strength of the material. By such action, as accomplished by the present method, the normally weakest portion of the welded tubular structure has substantially a strength equal to or greater than the balance of the structure.

The prior art also teaches the use of seamless tubular material which may be ground, honed and polished in order to create a smooth surface along which other elements may move. However, in such devices as accumulators, for example, it is necessary that any pores or other small openings in the material be closed in order that anticipated pressures may be maintained in such devices. Grinding, honing or polishing of running surfaces will not accomplish this purpose seamless tubing and, heretofore, consideration has never been given to utilization of the less expensive welded tubing inasmuch as no process has existed whereby the strength of such welded tubing might be maintained in all areas thereof. The honing or otherwise cutting of polished surfaces opens pores in the material surface which would otherwise remain closed. Such honing imbeds abrasives in the pores which thereafter serve to cut adjacent elements that must run on the surface.

Obviously, when enlargements are formed in portions of tubular material, such enlargements must necessarily have the same strength characteristics as other portions of the material. By applying heat and merely upsetting such enlargements, the strength of the material is not maintained. The present invention contemplates the provision of a welded tubular structure and method of forming such structure as by cold forming whereby to maintain strength of the material in all portions and areas of the finished article.

In many installation situations, high strength, non-porous tubular components are required which must also be light in weight. Heretofore, when such structures were made from stainless steel, or the like material, it has been necessary to utilize heavy walled tubes in order to maintain proper strength characteristics and approach a sealed situation. The present invention further contemplates the provision of light weight replacements for new or existing products wherein inexpensive material such as, for example, low carbon steel, is used and strength characteristics are maintained at the level formerly only attributable to either heavy and/or alloyed material.

In times when various materials may be curtailed, as in time of war, for example, it is extremely desirable that use be made, in as many instances as possible, of readily available material for the manufacture of the necessary tools of war. The present invention provides means by which such use of low cost, easily workable and effective material may be utilized for such manufacture. When using a low carbon steel, it is possible to obtain a sound weld using a high production rate in the welding of the steel, and, by cold working such material, it is possible to approach the physical characteristics of alloy or high carbon steels, together with a non-deformed structure.

It is accordingly one important object of the present invention to provide a welded tubular structure and a method of forming such a structure.

It is another important object of the present invention to provide a rapid, economical and efficient method of forming a welded tubular structure and working a seam weld in such structure in such a manner as to orient the grain structure thereof and to provide a homogeneous metallic arrangement wherein the seam weld has a strength commensurate with or greater than the strength of the balance of the tubular structure.

A further object of the present invention is to provide a method of forming welded tubular structures and the article thus formed, through use of an initial welded material and wherein constant concentricities may be maintained rather than limited eccentricity as provided in seamless tubular material.

A still further object of the present invention is to provide an article of manufacture that is constructed from welded tubular material and wherein a finished surface is provided that need not thereafter be ground, honed or polished, but that has a work hardened, non-porous surface on the material.

It is a still further important object of the present invention to provide a welded tubular article of manufacture wherein a weld seam has an oriented grain structure in order that a homogeneous condition of both the seam weld and the adjacent material may be created.

Further, it is another important object of the present invention to provide a novel method of forming welded tubular material wherein the end product or article formed thereby will be relatively light in weight while retaining high strength characteristics and a cold worked condition wherein the elastic limit of the material is closely approached in all areas thereof including the seam weld therein.

Other and further important objects of the present invention will become apparent from the disclosures in the following detailed description of the method and article of the present invention, in the appended claim and in the accompanying drawings, wherein:

Fig. 1 is an elevation view, partially in section, showing one type of article that may be manufactured by the present process, the article being shown in connection with an adjacent object to which it may be attached;

Fig. 2 is a schematic sectional view showing welded tubular material prior to being employed in the various steps of the present process;

Fig. 3 is a view schematically illustrating the first step in the present process;

Fig. 4 is a schematic sectional view showing an intermediate step in the present process;

Fig. 5 is a schematic sectional view showing essentially the second important step in the present process;

Fig. 6 is a schematic sectional view showing a further use of the present process;

Fig. 7 is a view similar to Fig. 6 showing a second step from that disclosed in Fig. 6;

Fig. 8 is an enlarged fragmentary view showing a portion of a tube and the weld seam therein;

Fig. 9 is a fragmentary sectional view showing the weld seam of Fig. 8 as it would appear following the first step of the process;

Fig. 10 is a view similar to Fig. 9 showing the weld seam following grain orientation of the weld and as it would appear following the second step of the process;

Figure 11:
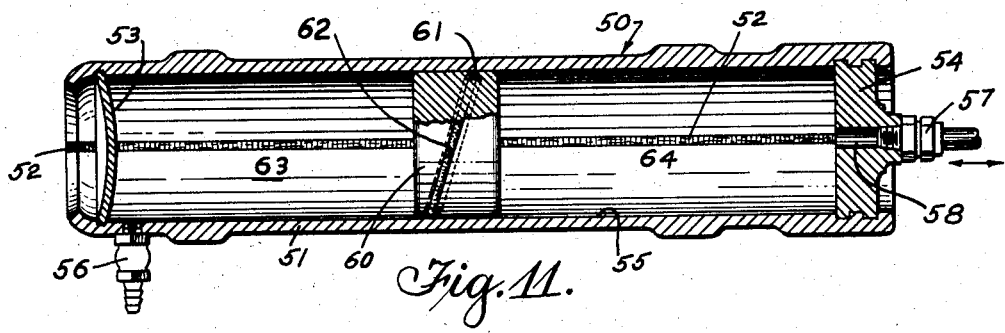
Fig. 11 is a longitudinal sectional view of one type or article that may be formed by the present process.

With reference to the drawings, and with specific reference primarily to Figs. 1 through 5, inclusive, as shown in Fig. 1, the welded tubular structure may take the form of an elongated tubular article such as a flare tube, for example, as indicated generally at 10. As shown, the article 10 includes an elongated body portion 11 having a seam weld 12 extending throughout the length thereof. One end 13 of the arrangement 10 may be enlarged, as by the present method, and may be provided with suitable attachment means for securing the article to an adjacent article, as indicated at 14.

In connection with this invention, it is to be clearly understood that the article shown in Fig. 1, and hereinafter to be also described in connection with Fig. 11, is merely representative and illustrated and described by way of example only. While the invention will be shown and described as being applied to an enlargement or other deformation of one or more of the ends of the article, it is to be clearly understood that the process may be utilized for orienting the grain structure of a tube seam weld either at the ends of the tube, in areas intermediate the ends and/or adjacent the central portion thereof, or along the entire length of the structure.

With reference now primarily to Figs. 1 through 5 inclusive, the method of forming the welded tubular structure is shown in the various steps utilized in the method of the present invention. As shown in Fig. 2, a length of welded tubular material 15, having wall portions 16 and a longitudinally extending seam weld 17, is positioned with one end in contact with a retaining surface 18. For clearness of illustration, the weld is shown as being somewhat wider than might actually be the case. In accordance with the first step in the process, as shown in Fig. 3, the tubular material 15 may be restrained over a suitable upstanding restraining member 19 which may be secured to or mounted on the surface 18. In this connection, it is to be understood that the restraining member 19 may take the form of an element that is adapted to engage the outer surface of the wall 16 rather than as shown being inserted within the tubular material. In this first step in the process, a cylindrically ended tool which may take the form of a ball 20, is forced into the upstanding end of the tubular material 15 as by a suitable ram 21, thus circumferentially to stretch the seam weld 17 and expand the tubular material as indicated at 22. During this step of the process, it is to be noted that the thickness of the wall, as at 22, is somewhat reduced over the thickness of the balance of the unexpanded portion of the material. At this point, it is to be understood that the expanding tool or ball 20 may be of any desirable configuration having a cylindrical end portion and may be extended and/or forced into the end of the tubular material for any distance as may be desired for the particular final construction. In some instances, it may be desirable to force the expanding tool completely through the length of the tubular material; however, for purposes of illustration, in connection with the present process, the tool will be shown and described as passing into merely a portion of the end of the welded tubular material.

With reference to Fig 8 of the drawing, wherein a portion of the initial seam weld 17 is shown, it is to be noted that edges 23, of the original material from which the welded tube was formed, lie in spaced relationship, with the weld material being disposed therebetween. As shown in Fig. 9, the first step in the process, as illustrated in Fig. 3, will orient the grain structure of the seam weld 17 so that the configuration illustrated in Fig. 9 at 17a will exist with the metallic grain structure in the seam extending substantially transverse in a circumferential direction with respect to the walls 16 of the tubular material.

In Fig. 4 an intermediate step of the process is shown wherein the expanded end 22 of the tubular material may be radially outwardly flanged as at 24 through use of a suitable flanging tool 25. In this instance, the expanded tubular material may be restrained on a flanging die 26, or any other suitable arrangement to accomplish the establishment of the flange 24 as by cold working rather than the application of heat. In this connection, it is to be understood that the step in the process illustrated in Fig. 4 is merely an intermediate step, with the flange 24 being utilized to support one end of the tubular structure during further steps in the process. In some instances, it may be desirable to eliminate the flange.

As shown primarily in Fig. 5, the expanded end, flanged tubular structure is placed in a restraining die 27, having a configuration substantially equal to the configuration of the final product, and having a relatively sharp, annular recess 28 that will be spaced from the formerly expanded tube, as shown by the dotted lines at 22. In accordance with the second step in the process, a forming tool, having a surface which will perform the act of drawing or stretching the material and that may take the form of a ball 30, is next forced into the already expanded end 22 of the tubular structure, in order further to cold work the material including the seam weld 17, by longitudinally drawing the material along the restraining surface 31 of the restraining die 27 and forcing excess material downwardly and outwardly to conform to the configuration of the recess 28.

The longitudinal drawing action thus accomplished on the seam weld 17 is shown in enlarged detail at 17b in Figs. 5 and 10, wherein it is to be noted that the grain structure within the seam weld is now oriented in substantially a longitudinal direction, thus to create a homogeneous situation between the wall material 16 of the tubular structure and the seam weld 17b. The oriented grain structure in the seam weld 17b will at this time closely approximate the grain structure in the wall material 16 and will have a strength commensurate with that of the wall material thus to enable utilization of the welded tubular material in situations heretofore employing only seamless tubing.

The restraining die 27 may take a variety of forms, as for example, as shown at 27' in Fig. 6. In this instance, a welded tubular structure 15', having a wall 16' and a longitudinal seam weld 17', is seated in a restraining die 27', following either the first operation as illustrated in Fig. 3 or the intermediate operation as illustrated in Fig. 4. In this instance, the tubular structure 15' is shown as being formed with an outwardly extending flange 24' while side walls 31' of the restraining die 27' are provided with an annular groove 33 into which the material of the expanded wall structure is forced as by the action of a longitudinally traveling tool 30'. The seam weld 17b', at this time, has been oriented in the form shown in Fig. 10. Following the operation shown in Fig. 6, the tubular structure formed thereby may be forced longitudinally into a die 34 in the direction indicated by the arrows 35 so as to deform an upper wall portion 36 of the structure 15' and to move the annular flange, formed by previous expansion into the groove 33, toward an inwardly directed position as shown at 37. It is to be noted that the portion of the wall structure, as shown at 36, has been substantially strengthened by the inwardly directed annular enlargement of longitudinal section 37 and this area may further be utilized for the purpose of establishing threads or other connection means.

With reference again to Fig. 5 of the drawings, the relatively thick portion of the drawn tubular structure, as shown in this figure and as disposed in the base of the annular recess 28, may be removed by any suitable means such as by machining or additional extruding or drawing, in order that the final configuration, approximately that shown in Fig. 1, may ultimately be developed.

With reference to Fig. 11 of the drawings, it is to be noted that other articles of manufacture may be constructed utilizing the present method and that the orientation of the seam weld along the welded tubular structure may be accomplished by substantially reversing the process hereinbefore disclosed. With specific reference to Fig. 11, the article of manufacture thus illustrated is indicated at 50 and includes an elongated wall structure 51 having a longitudinally extending seam weld 52. The article 50 is shown as having end walls 53 and 54, with an exceptionally smooth and concentric cylindrical inner surface 55 being presented. By the addition of a filling check valve arrangement 56 and an exit conduit structure 57, the former being secured to the wall structure at one end of the article adjacent the end wall 53, the latter being secured in connection with the central bore 58 in the end wall 54, an accumulator form of article is thus presented. For completion of this article, a movable wall in the form of a piston 60, is disposed within the cylinder 55 and has a sealing member 61 disposed with a groove 62. The groove 62 is disposed generally at an angle other than normal to the axis of the article 50, there being side walls for the groove 62 that converge radially outwardly, thus to provide a means to prevent rolling of the sealing member 61. The wiping or shearing action of the sidewalls of the groove 62 also serve immediately to release the sealing member 61 upon movement of the piston 60. A pair of chambers 63 and 64 are thus formed within the cylinder 55 on each side of the piston 60, to be utilized as, for example, by the placement of a gas under pressure in the chamber 63 and an oil, for example, in the chamber 64. When a demand is created downstream from the fitting structure 57, the pressure of the gas within the chamber 63 will tend to move the piston 60 toward the chamber 64 and force the non-compressible fluid such as the oil therefrom.

Figure 12:
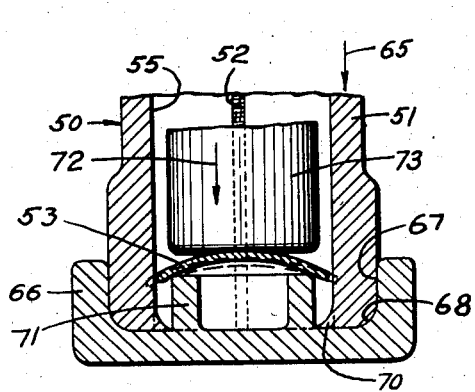
Fig. 12 is a relatively schematic sectional view showing a method of weld grain orientation in connection with the establishment of an end wall for a tubular structure.

With reference to Fig. 12 of the drawings, a step in the method of the present invention is shown for affixing the end wall 53 within the tubular structure 50. In this form of the invention, the end of the tubular structure 50 is forced, in the direction of the arrow 65, into a restraining die 66 having a recess 67 with an annular, inwardly curved lower portion 68. This action, in forcing the welded tubular structure 50 into the die 66, serves to compress the end of the tubular structure, as shown at 70, thereby to orient a portion of the seam well 52. In order to complete the operation of securing the end wall 53 in the tubular structure 50, the end wall, formed with a concave outer surface and of an original diameter slightly less than the diameter of the cylinder 55 of the structure, is dropped into the space defined by the cylinder 55 and adapted to rest on a locating spacer member 71 formed integrally upwardly from the die 66. By application of pressure in the direction of the arrow 72, and movement of a plunger 73, the end wall 53 has its concave configuration reduced with the periphery thereof being forced outwardly into the surrounding material of the walls 51 of the welded tubular structure 50, thereby further to orient the grain structure circumferentially in the seam weld 52. The end wall 53 finally is moved to an ultimate position shown by the dotted lines in Fig. 12.

Figure 13:
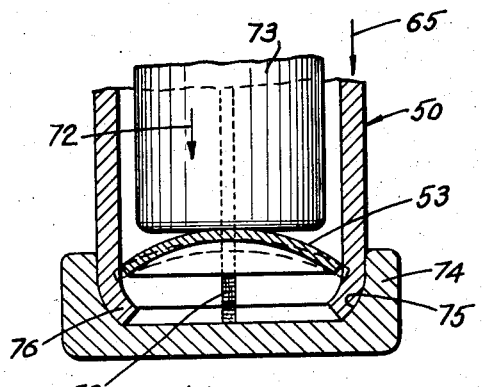
Fig. 13 is a view similar to Fig. 12 showing another method of establishing an end wall for a tubular welded structure.

In Fig. 13 an alternative arrangement for establishing the end wall 53 in the tubular structure 50 is shown, and comprises the movement of the tubular structure 50 in the direction of the arrow 65 into a die 74 having an inwardly directed recess 75, thus to deform the entire end 76 of the structure 50 inwardly and accomplish a similar cold working inwardly in the area of the seam weld 52. The plunger 73 is next utilized to move the end wall 53 to the position shown by the dotted lines, with axial outward movement of the end wall blank relative to the end of the tubular structure, being limited by the inwardly curved configuration 76 of the tubular structure 50. In this modified method, the seam weld 52 is cold worked in a similar manner to that hereinbefore described, thereby to orient the grain structure of the seam weld in the manner shown in Figs. 9 and 10; however, for a shorter axial length than described in connection with the steps illustrated in Figs. 3 through 5 inclusive.

Figure 14:
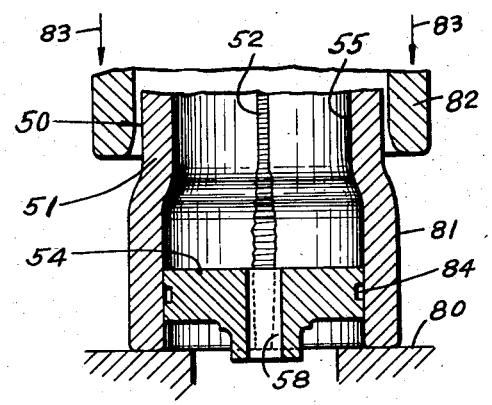
Fig. 14 illustrates a further modified method of weld grain orientation in connection with the establishment of a modified form of end wall in a welded tubular structure.
Figure 15:
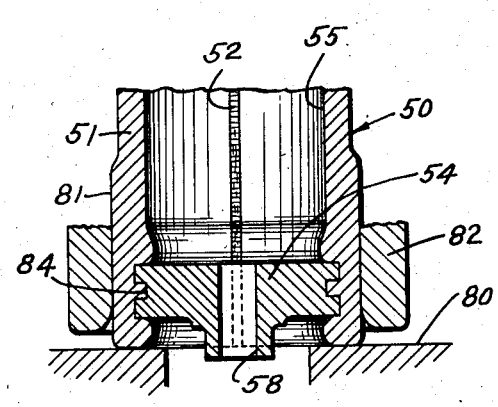
Fig. 15 is a view similar to Fig. 14 with various parts in different positions and an end wall established in the welded tubular structure.

In Figs. 14 and 15, a further alternative form of the method of the present invention is illustrated, in order that an end wall, similar to the end wall 54, may be established within the tubular structure 50. The method disclosed in these figures may be used in situations wherein a ram or the like cannot be extended through the cylindrical bore 55, as described in connection with the alternative forms of the process shown in Figs. 12 and 13. In this latter form of the process of the present invention, the end of the tubular structure 50 may be restrained against axial movement on a surface 80, and the end wall 54 disposed within an open end of the tubular structure which previously has been expanded, as by the method hereinbefore discussed, in the area indicated at 81. The seam weld 52 has thus been once circumferentially oriented to assume the grain orientation shown in Fig. 9. A drawing member 82 may then be moved in the direction of the arrows 83, about the outer surface of the tubular structure 50 and the expanded portion 81, in order that the expanded portion may be cold worked and drawn inwardly, as shown in Fig. 15, thus allowing the material of the wall 51 to be formed about the periphery of the end wall 54. As shown in Figs. 14 and 15, the end wall 54 may be provided with a peripheral groove 84 in order that a tight seal may be provided thereabout. In this latter operation, as shown in Fig. 15, the area of the seam weld 52, adjacent the expanded portion 81, is thereby also drawn as by action of the member 82, thereby to orient the grain structure in this portion of the seam weld and establish a cold worked condition similar to that shown in Fig. 10.

Figure 16:
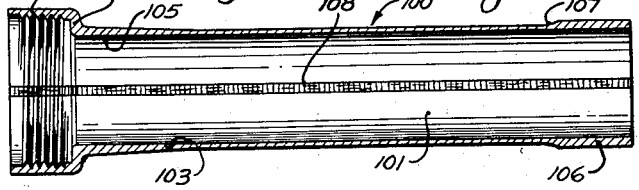
Fig. 16 is a sectional view of one typical form of article using a tapered wall portion which may be established through use of the method of the present invention.

In Fig. 16, a typical form of an article such as, for example, as specific flare tube, is shown having features that are somewhat different from those shown in the flare tube 10 of Fig. 1. The tube of Fig. 16 is shown as indicated generally at 100 and includes a cylindrical tube portion 101 having an enlargement 102 on one end thereof which may provide means for attaching the tube 100 to an adjacent structure. The wall portion 101 has a tapered increased thickness portion 103 adjacent the enlargement 102 in order that increased strength may be obtained in this area. The increased thickness portion 103 terminates at an annular radially extending flange 104 which forms a portion of the enlargement 102. The inner diameter 105 of the tube is cylindrical throughout the length of the wall portion 101 and increased thickness area 103. The end of the tube opposite from the enlargement 102 is provided with a thickened portion 106 that has a tapered end 107. The thickened portion 106 may add additional strength to the end of the tube on which it is formed.

As in the previous form of the present invention, the specific tube 100 has a cold worked seam weld 108 extending throughout the length thereof with this tube being preferably manufactured from welded tubing in accordance with the method of the present invention and having the various advantages and features of novelty that will be had in accordance herewith.

It may thus be seen that there has been disclosed herein a method of forming welded tubular material and for working the seam weld therein in such a manner as to orient the grain structure of the seam weld and establish a homogeneous structure between the material of the seam weld and the balance of the wall portion of the structure. In the application of such cold working, it may be seen that each step in the process provides a means by which the weld, and the wall material, may be tested and examined for imperfections and/or weaknesses prior to the utilization of the oriented weld structure in finished articles of manufacture, or prior to additional expensive machining or other like operations on the grain oriented product. Additionally, it is to be noted that, in most cases, further honing or machining need not be made along the work surfaces so as not to destroy the non-porous surface structure thus established. The smoothness of the worked surface, including the area of the seam weld, and the lack of roughness that would tend to cause an abrasive action, is largely dependent upon, and in most cases, directly proportional to the finish and polish on the tool or tools used in the working of the material. By utilizing the present method of forming welded tubular material, it has been found that a material of the seam weld is somewhat the stronger actually than the material on the wall structure in the balance of the tube, evidence of this fact having been established through multiple pressure tests and the like.

The surface finish thus obtained, on both the surface of the tubular material and in the material of the seam weld, is of such a compact nature as to reduce the porosity of the metal to an extremely low limit. This condition enables use of the end product or article of manufacture in such applications as the accumulator shown in Fig. 11, wherein a hydraulic seal must be maintained through the surface and walls of the metal including the seam weld. By such closing of the normally existing pores in the metal, the unit strength thereof is increased to a level whereby the elastic limit of the metal closely approaches the ultimate strength of the material. In other words, the point at which the metal would fail under stress is approached within close limits, approximately ninety percent, for example, without actually coming to or exceeding such point. By this action, the weight of the end product is held to an absolute minimum commensurate with the use in which the product is to be placed.

While the method of forming welded tubular structures has been defined hereinbefore as directed toward the utilization of steel or various alloys of steel, it should be understood that the present process is applicable for use in the forming of many other metals such as, for example, copper, aluminum, brass, or the like, and may further be applied to the cold working of various types of plastics which may have particular grain structures. Basically, then, the present method of forming welded structures provides for means by which the grain of material used in such structures may be cold worked for orientation thereof thus to increase the tensile strength to a point approaching the ultimate elastic limit of the material and simultaneously creating a non-porous surface condition.

Having thus described the invention and the present embodiments thereof, it is desired to emphasize the fact that many modifications may be resorted to in a manner limited only by a just interpretation of the following claim.

I claim:

The method of forming a tubular structure of uniform wall thickness and uniform circumferential strength from an elongated tube having a longitudinal seam weld and heat weakened areas in said weld and in a portion of the material of said tube immediately adjacent said weld comprising, in combination, the steps of: restraining said tube against longitudinal movement; freely cold expanding said tube circumferentially first to orient grain structure in said seam weld and said portion of said tube immediately adjacent said weld, other portions of said tube being expanded proportionally a smaller amount than said weld and tube portion adjacent said weld; restraining one radial surface of said expanded tube; and further orienting said grain structure of said seam weld and said tube portion by cold working and in a direction substantially normal to said first orientation of said grain structure, whereby to produce the desired uniform strength tube having low surface porosity and increased material density.

References Cited in the file of this patent

UNITED STATES PATENTS 801,683    Penfold _____ Oct. 10, 1905

(Other references on following page)

UNITED STATES PATENTS

| | | |
|---|---|---|
| 1,402,508 | Lothrop | Jan. 3, 1922 |
| 1,471,134 | Ash | Oct. 16, 1923 |
| 1,760,560 | Kranz | May 27, 1930 |
| 1,801,006 | Jacoby | Apr. 14, 1931 |
| 1,984,083 | Riemenschneider | Dec. 11, 1934 |
| 1,991,556 | Hoplins | Feb. 19, 1935 |
| 2,010,155 | Hull | Aug. 6, 1935 |
| 2,029,800 | Templin | Feb. 4, 1936 |
| 2,053,975 | Spatta | Sept. 8, 1936 |
| 2,261,056 | Dunn | Oct. 28, 1941 |
| 2,440,065 | Ashton | Apr. 20, 1948 |
| 2,541,250 | Hogg | Feb. 13, 1951 |
| 2,591,160 | Kilian | Apr. 1, 1952 |